United States Patent [19]

Akiyama et al.

[11] Patent Number: 4,985,211

[45] Date of Patent: Jan. 15, 1991

[54] EXHAUST GAS PROCESSING APPARATUS FOR PAINT DRYING OVEN

[75] Inventors: Shunichi Akiyama; Norio Sato, both of Toyota; Kenichirou Suzuki, Aichi; Taisuke Yoshimoto, Nagoya; Hideaki Nakasho, Toyota, all of Japan

[73] Assignees: Toyota Jidosha Kabushiki Kaisha, Toyota; Kabushiki Kaisha Toyota Chuo Kenkyusho, Aichi; Trinity Industrial Corporation, Tokyo, all of Japan

[21] Appl. No.: 262,964

[22] Filed: Oct. 26, 1988

[30] Foreign Application Priority Data

Oct. 26, 1987 [JP] Japan ............................ 62-163416[U]

[51] Int. Cl.5 .............................................. B01D 53/36
[52] U.S. Cl. .................................... 422/171; 422/177; 422/180; 422/190; 422/193; 422/211; 423/213.2; 423/245.3
[58] Field of Search ............... 422/171, 177, 180, 190, 422/193, 211; 423/245.3, 213.2

[56] References Cited

U.S. PATENT DOCUMENTS

| | | |
|---|---|---|
| 3,259,453 | 7/1966 | Stiles . |
| 3,599,427 | 8/1971 | Jones et al. . |
| 3,656,915 | 4/1972 | Tourtellotte . |
| 3,910,770 | 10/1975 | Kobylinski et al. . |
| 4,021,203 | 5/1977 | Givens et al. ........................ 422/171 |
| 4,054,418 | 10/1977 | Miller et al. . |
| 4,082,514 | 4/1978 | Torres . |
| 4,118,199 | 10/1978 | Völler et al. ........................ 422/171 |
| 4,225,561 | 9/1978 | Torres . |
| 4,255,173 | 3/1981 | Mayer et al. . |
| 4,270,896 | 6/1981 | Polinski et al. . |
| 4,388,275 | 6/1983 | Fratzer et al. .................. 422/222 X |
| 4,403,948 | 9/1983 | Waldmann et al. . |
| 4,416,674 | 11/1983 | McMahon et al. ............. 422/171 X |
| 4,462,812 | 7/1984 | Bly et al. ......................... 422/179 X |
| 4,492,770 | 1/1985 | Blanchard et al. . |
| 4,661,329 | 4/1987 | Suzuki et al. ..................... 423/245.3 |

FOREIGN PATENT DOCUMENTS

| | | |
|---|---|---|
| 2825306 | 12/1979 | Fed. Rep. of Germany . |
| 41-5925 | 3/1966 | Japan . |
| 691181 | 10/1979 | U.S.S.R. . |

Primary Examiner—Robert J. Warden
Assistant Examiner—Lynn M. Kummert
Attorney, Agent, or Firm—Cushman, Darby & Cushman

[57] ABSTRACT

An exhaust gas processing apparatus for a paint drying oven of this invention comprises a reaction container; a first catalyst layer disposed at an upstream side of the reaction container comprising a support of a honeycomb substance or a foamed substance, a carrier layer formed on the support and a platinum group element catalyst loaded on the carrier layer; a second catalyst layer disposed downstream of the first catalyst layer comprising a support of a pellet substance, a honeycomb substance or a foamed substance and a platinum group element catalyst; and a third catalyst layer disposed downstream of the second catalyst layer comprising a support, a carrier layer formed on the support and a copper-cerium-silver catalyst loaded on the carrier layer. Thus, the exhaust gas processing apparatus of this invention exhibits improved exhaust gases purifying abilities, even at relatively low temperatures, and less pressure drop.

1 Claim, 3 Drawing Sheets

EXHAUST GAS PROCESSING APPARATUS FOR PAINT DRYING OVEN

BACKGROUND OF THE INVENTION

1. Field of the Invention

This invention relates to an improvement on an exhaust gas processing apparatus for a paint drying oven.

2. Discussion of the Background

Many exhaust gas processing apparatuses have been developed to purify exhaust gases containing various harmful components generated by incinerators. For instance, the following (1) through (6) have been known as typical examples of the exhaust gas processing apparatuses:

(1) U.S. Pat. No. 4,255,173 discloses an automobile type exhaust gas lead filter. The gas lead filter has a tubular housing with alumina coated metal wire fibers as the filter bed, which is centrally located.

(2) U.S. Pat. No. 4,225,561 discloses a catalytic converter for transforming polluting gases into non-polluting gases. The catalytic converter has an open-ended elongated shell, a metallic grill coated with silver, palladium or mixtures thereof, and a metallic mesh coated with silver, palladium or mixtures thereof.

(3) U.S. Pat. No. 4,492,770 discloses a catalyst for an internal combustion engine. The catalyst has a support, an active phase comprising copper, cerium and/or iron, at least one metal selected from the group consisting of platinum and palladium, and at least one metal selected from the group consisting of iridium and rhodium.

(4) Japanese Unexamined Utility Model Publication (KOKAI) No. 118626/1986 discloses an exhaust gas processing apparatus. The exhaust gas processing apparatus comprises two or three layers, i.e. one or two layers of platinum group element catalyst having heat resistance fibers as the support and one layer of copper-cerium catalyst having ceramic porous substance as the support.

(5) Japanese Unexamined Utility Model Publication (KOKAI) No. 118627/1986 discloses another exhaust gas processing apparatus. The exhaust gas processing apparatus comprises two layers, i.e. a platinum group element catalyst and copper-cerium catalyst.

(6) U.S. Pat. No. 4,661,329 (Japanese Unexamined Patent Publication (KOKAI) No. 146348/1986) discloses an oxidation catalyst. The oxidation catalyst comprises copper-cerium-silver catalyst having ceramic porous substance as the support.

The platinum group element catalyst comprises elements of the platinum group, such as platinum, palladium, iridium, rhodium osmium and ruthenium. The platinum group element catalyst has been employed for the exhaust gas processing apparatus, because the platinum group elements catalyst has been known to have a high dehydrogenation activity and a stable heat resistance property.

The copper-cerium-silver catalyst disclosed in above (6) has been employed as a catalyst for efficiently burning and decomposing aldehydes contained in exhaust gases, which the platinum group element catalyst cannot purify sufficiently, at a low temperature.

However, the present inventors experimentally found that tar-like substances produced by incomplete combustion of harmful components contained in exhaust gases deposited on the supports, increased pressure drop and shortened the lives of the catalysts when the platinum group metal catalyst and copper-cerium-silver catalyst were employed for an exhaust gas processing apparatus simultaneously in order to use their respective advantages and when the exhaust gas processing apparatus was operated at relatively low temperatures.

This invention has been developed to overcome these problems. It is therefore an object of this invention to provide an exhaust gas processing apparatus for a paint drying oven maintaining its exhaust gases purifying abilities at relatively low temperatures and exhibiting pressure drop, caused by the tar-like substances and dusts contained in exhaust gases coming from a paint drying oven, in a lesser degree.

An exhaust gas processing apparatus for a paint drying oven of this invention comprises a reaction container; a first catalyst layer disposed at an upstream side of the reaction container comprising a support a honeycomb substance or a foamed substance, a carrier layer formed on the support and a platinum group element catalyst loaded on the carrier layer; a second catalyst layer disposed downstream of the first catalyst layer comprising a support a pellet substance, a honeycomb substance or a foamed substance and a platinum group element catalyst; and a third catalyst layer disposed downstream of the second catalyst layer comprising a support, a carrier layer formed on the support and a copper-cerium-silver catalyst loaded on the carrier layer. The exhaust gas processing apparatus oxidizes and decomposes harmful components contained in exhaust gases coming from a paint drying oven.

The exhaust gas processing apparatus of this invention performs dehydrogenation and combustion reactions of exhaust gases simultaneously, and decreases harmful components in exhaust gases remarkably.

The dehydrogenation reaction is performed by the platinum group elements catalyst of the first and second catalyst layers. These platinum group element catalysts accelerate the dehydrogenation reaction. The dehydrogenation reaction subtracts hydrogen from organic compounds such as phenols and alcohols having a hydroxyl group, and converts them to aldehydes.

The combustion reaction is performed by the copper-cerium-silver catalyst of the third catalyst layer. This copper-cerium-silver catalyst changes the aldehydes converted on the platinum group elements catalysts of the first and second catalyst layers disposed upstream to the third catalyst layer as well as aldehydes originally contained in exhaust gases to carboxylic acids, and finally to harmless and odorless carbon dioxide gas and water.

The exhaust gas processing apparatus of this invention employs a honeycomb or foamed substance for the support of the first catalyst layer, and a pellet, honeycomb or foamed substance for the support of the second catalyst layer. For the support of the third catalyst layer, the exhaust gas processing apparatus may employ a honeycomb or foamed substance. This arrangement can deposit the tar-like substances and dusts in exhaust gases on the first catalyst layer without depositing them on the second and third catalyst layers, because the honeycomb or foamed substance has the tar-like substances deposited on it in greater amount than a support made of heat resistance fibers does, and because the honeycomb or foamed substance causes less pressure drop. The tar-like substances are produced by processing exhaust gases at relatively low temperatures during the dehydrogenation reaction. Here, the foamed substance means a substance like a polyurethane foam having a plurality of cells, and the honeycomb substance means a substance having a plurality of through holes like the six-sided cells made by bees.

Further, it is preferred to employ a support made of an alumina pellet substance, a honeycomb substance or a foamed substance for the second catalyst layer in order to reduce reaction heat with ease and prevent degradation by heating.

Furthermore, the support of the third catalyst layer is not explicitly defined, however, it is preferred to employ a honeycomb or foamed substance for the support when a pellet substance is employed for the second catalyst layer. This arrangement helps to suppress pressure drop increment, because pressure drop increases when a pellet substance is employed for both of the second and third catalyst layers.

Thus, the exhaust gas processing apparatus of this invention suppresses pressure drop increment and accelerates purifying reactions of harmful components in exhaust gases efficiently.

Further, the present inventors experimentally confirmed that the following arrangements for the supports of the first and second catalyst layers of the exhaust gas processing apparatus of this invention have the tar-like substances deposited more on the first catalyst layer and suppress pressure drop:

The honeycomb substance for the supports of the first and second catalyst layers may have a cell density of 400 cells/inch$^2$ or less and an apparent surface area of from 8 to 25 cm$^2$/c.c. It is more effective that the honeycomb substance has a cell density of 200 cells/inch$^2$ or less and an apparent surface area of from 8 to 25 cm$^2$/c.c.

The foamed substance for the supports of the first and second catalyst layers may be 17-mesh or less foamed substance and have an apparent surface area of from 8 to 25 cm$^2$/c.c. When the foamed substance with more than 17-mesh is employed, for instance when a 20-mesh foamed substance is employed, the exhaust gas processing ability decreases and pressure drop tends to increase. The foamed substance serves more for the objects of this invention when it is from 6 to 13-mesh foamed substance and has an apparent surface area of from 8 to 25 cm$^2$/c.c.

Furthermore, as for a material for the honeycomb and foamed substances for the supports may be cordierite, mullite, aluminum titanate, alumina, silica, silicon carbide, silicon nitride, zircon, Fe-Cr-Al-Y alloy or Ni-Cr alloy.

Moreover, wash coating may be done first on the supports to form a carrier layer, and then catalysts may be loaded on the carrier layer. Or the catalysts may be loaded on a powdery substance for forming the carrier layer, and then loaded the supports by wash coating done simultaneously with carrier layer forming. Ceramics for forming the carier layer may be alumina, silica, magnesia, zeolite, titania and diatomaceous earth and so on.

Thus, in the exhaust gas processing apparatus of this invention, the first catalyst layer has the tar-like substances and dusts deposited thereon, and the platinum group element catalyst of the first catalyst layer performs the dehydrogenation reaction. Then, the platinum group element catalyst of the second catalyst layer performs a thorough dehydrogenation reaction without causing pressure drop at the second catalyst layer. Finally, the copper-cerium-silver catalyst of the third catalyst layer performs the combustion reaction of the aldehydes to decompose them to harmless and odorless carbon dioxide gas and water without causing pressure drop at the third catalyst layer.

As a result, the following advantages can be obtained from the exhaust gas processing apparatus of this invention:

The exhaust gas processing apparatus of this invention improves energy saving effect by lowering the reaction temperature by from 50° to 100° C. to those of conventional exhaust gas purifying apparatuses and cuts down the running cost while maintaining or even improving the purifying abilities of exhaust gases.

Further, an exhaust gas processing apparatus with a longer life can be provided, because the pressure drop is suppressed by having the tar-like substances associating with the lowered reaction temperature and dusts deposited on the first catalyst layer.

Furthermore, an exhaust gas processing apparatus with a simple construction can be manufactured in a less expensive manufacturing cost, because the exhaust gas processing apparatus of this invention performs the dehydrogenation and oxidation/decomposition reactions simultaneously.

The running cost can be reduced further, because the first catalyst layer is washable and can be cleaned easily. Accordingly, man-power requirement for maintenance is minimized and the catalyst life is extended.

Even initial cost for building facilities can be reduced, because less heat resistant and less expensive materials can be employed for oven inner structural materials for building ovens.

BRIEF DESCRIPTION OF THE DRAWINGS

Advantages and objects of this invention will become apparent from the following description when taken in conjunction with the accompanying drawings, in which.

DETAILED DESCRIPTION OF THE PREFERRED EMBODIMENT

The exhaust gas processing apparatus for a paint drying of this invention will be hereinafter described with reference to preferred embodiments.

Figure 1:
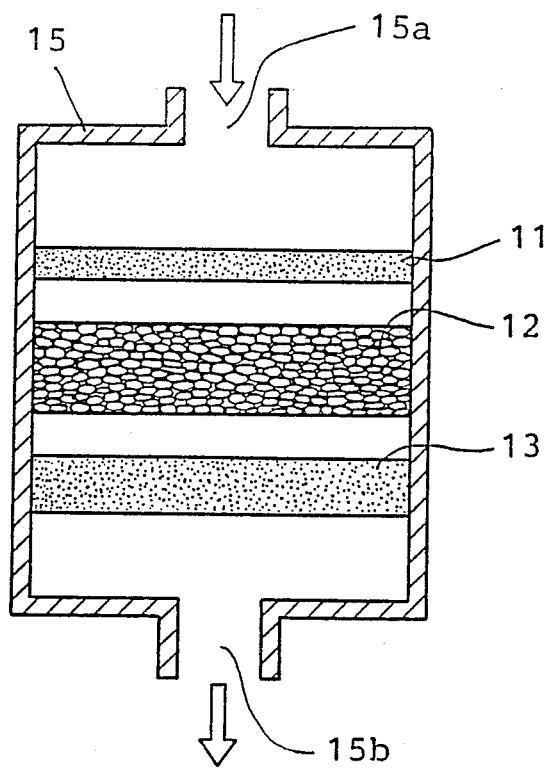
FIG. 1 is a schematic cross sectional view of a preferred embodiment of an exhaust gas processing apparatus for a paint drying oven according to this invention.

As schematically illustrated in a cross sectional view in FIG. 1, a preferred embodiment of an exhaust gas processing apparatus 1 according to this invention comprises a reaction container 15, a first catalyst layer 11 disposed at upstream side of the reaction container 15, a second catalyst layer 12 disposed downstream to the first catalyst layer 11, and a third catalyst layer 13 disposed downstream to the second catalyst layer 12.

FIRST PREFERRED EMBODIMENT

A first preferred embodiment of the exhaust gas processing apparatus 1 has the first catalyst layer 11 comprising a support made of a 10-mesh cordierite foamed substance, a carrier layer formed by wash coating γ-alumina on the support and platinum group element catalyst loaded on the carrier layer, the second catalyst layer 12 comprising a support made of alumina pellet substances and platinum group element catalyst loaded on the support, and the third catalyst layer 13 comprising a support made of a 13-mesh cordierite foamed substance, a carrier layer formed by wash coating α-alumina on the support and copper-cerium-silver catalyst (hereinafter referred to as Cu-Ce-Ag catalyst) loaded on the carrier layer. The foamed substance for the support of the first catalyst layer 11 has an apparent surface area of 15 cm/c.c., and the pellet substances for the support of the second catalyst layer 12 have a diameter of from 2 to 6 mm.

The platinum group element catalyst of the first and second catalyst layers 11 and 12 is loaded on the carrier layer or the support by the following method:

An aqueous solution of palladium nitrate, $Pd(NO_3)_2$, or platinum dinitrodiammine, $Pt(NH_3)_2(NO_2)_2$, is prepared. The support with or without the carrier layer is immersed into the aqueous solution of either palladium nitrate or platinum dinitrodiammine. After the immersion, the support is taken out of the aqueous solution and dried at 120° C. for 6 hours in air. The dried support is further calcined at 550° C. for 2 hour while flowing air over the support. Thus, platinum group element catalyst, namely palladium or platinum, is loaded on the carrier layer or the support. The loading amount of palladium is 0.2 g/liter with respect to the amount of alumina of the carrier layer or of the support, and the loading amount of platinum is 1.0 g per 1 liter with respect to the amount of alumina of the carrier layer or of the support.

The Cu-Ce-Ag catalyst of the third catalyst layer 13 is loaded on the carrier layer by the following method:

An aqueous solution of cerium (III) nitrate is prepared so that loading amount of metal cerium is 0.4 wt. % to the weight of alumina of the carrier layer. The support is immersed into the aqueous solution of cerium (III) nitrate. After the immersion, the support is taken out of the aqueous solution of cerium (III) nitrate and dried at 120° C. for 6 hours in air. The dried support is further calcined at 550° C. for 2 hours while flowing air over the support. Further, the support with the metal cerium loaded is immersed into an aqueous solution of copper nitrate. The aqueous solution of copper nitrate is prepared so that the loading amount of metal copper is 4 wt. % to the weight of alumina of the carrier layer. After the immersion, the support with metal cerium loaded is taken out of the aqueous solution of copper nitrate and dried at 120° C. for 6 hours in air. The dried support is further calcined at 550° C. for 2 hours while flowing air over the support. Furthermore, the support with the metal cerium and metal copper loaded is immersed into an aqueous solution of silver nitrate. The aqueous solution of silver nitrate is prepared so that the loading amount of metal silver is 1.5 wt. % to the weight of alumina of the carrier layer. After the immersion, the support with the metal cerium and metal copper loaded is taken out of the aqueous solution of silver nitrate and dried at 120° C. for 6 hours in air. The dried support is further calcined at 450° C. for 2 hours while flowing air over the support. Thus, Cu-Ce-Ag catalyst are loaded on the support.

The operation of the first preferred embodiment of the exhaust gas processing apparatus 1 will be hereinafter described.

Figure 2:
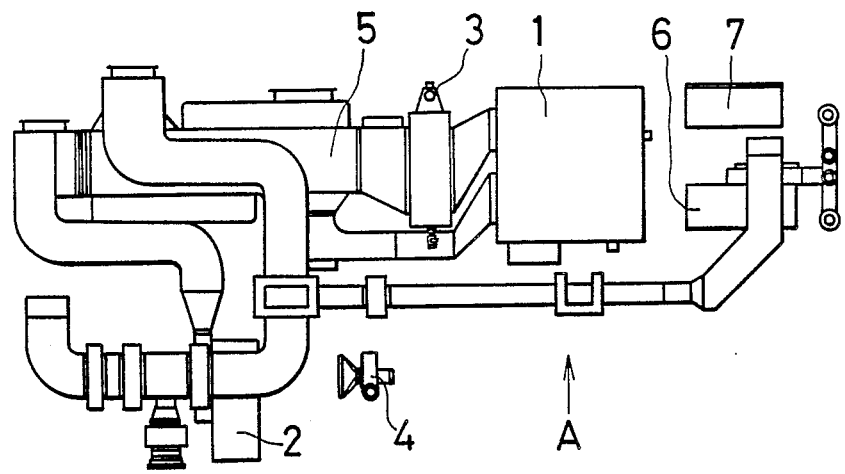
FIG. 2 is a schematic plan view illustrating a layout of a paint drying oven incorporating a preferred embodiment of an exhaust gas processing apparatus for a paint drying oven according to this invention.

The first, second and third catalyst layers 11, 12 and 13 in the reaction container 15 are heated to a reaction temperature, i.e. 200° to 400° C., by a burner 3 like one shown in FIG. 2. Note that the reaction temperature is lowered by 50° to 100° C. than those of conventional exhaust gas processing apparatuses.

An exhaust gas containing phenols, alcohols and so on is introduced into the exhaust gas processing apparatus 1 through an inlet 15a of the reaction container 15, and supplied to the first, second and third catalyst layers 11, 12 and 13. The first catalyst layer 11 works as a filter to remove solid particles like dusts in the exhaust gas, and deposits tar-like substances on itself and performs the dehydrogenation reaction in a simultaneous manner with the filtering. As above-mentioned, the tar-like substances are produced by incomplete combustion of harmful substances in the exhaust gas. Then, the second catalyst layer 12 further performs the dehydrogenation reaction without causing pressure drop. The dehydrogenation reaction at the first and second catalyst layers 11 and 12 subtracts hydrogens from harmful substances, such as phenols and alcohols, in the exhaust gas and converts them to aldehydes. The third catalyst layer 13 efficiently burns the converted aldehydes and aldehydes originally contained in the exhaust gas, and finally converts them to harmless and odorless carbon dioxide gas and water. As a result, a clean deodorized gas is discharged through an outlet 15b of the reaction container 15.

SECOND PREFERRED EMBODIMENT

A second preferred embodiment of an exhaust gas processing apparatus 1 comprises a first catalyst layer 11, a second catalyst layer 12 and a third catalyst layer 13 as the first preferred embodiment of the exhaust gas processing apparatus 1. Its schematic cross sectional view can also be illustrated in FIG. 1.

Examples 1 as well as Comparative Examples 1 through 3 were prepared to definitely describe advantages of this invention. Examples 1 and Comparative Examples 1 through 3 had arrangements of the first, second and third catalyst layers 11, 12 and 13 as summarized in Table 1.

TABLE 1

|  | Ex. 1 | Com. Ex.1 | Com. Ex. 2 | Com. Ex. 3 |
|---|---|---|---|---|
| 1st Catalyst Layer | A | None | B | A |
| 2nd Catalyst Layer | C | C | C | C |
| 3rd Catalyst Layer | D | D | D | None |

Note: Marks "A" through "E" indicate the following:
A: Support     6-mesh Cordierite Foamed Substance
    Apparent Surface Area     20 cm²/c.c.
    Carrier Layer     γ-alumina, 30 g/lit.
    Size     300 mm × 300 mm × 50 mm
    Catalyst     Pd, 0.2 g/lit.
B: Support     5 pieces of Glass Fiber Cloths E151 as per JIS R3413
    Catalyst     Pd, 0.2 g/lit.

TABLE 1-continued

| | |
|---|---|
| C: Support | γ-alumina Pellet Substance (φ3 − 6 mm) |
| Catalyst | Pt, 1.0 g/lit. |
| D: Support | 13-mesh Cordierite Foamed Substance |
| Apparent Surface Area | 13 cm²/c.c. |
| Carrier Layer | γ-alumina, 20 g/lit. |
| Size | 300 mm × 300 mm × 50 mm |
| Catalyst | Cu:Ce:Ag = 4.0:0.4:1.5 (wt. %) |

Note: Catalysts were loaded by methods similar to those described in the First Preferred Embodiment section.

The four exhaust gas apparatuses, i.e. Examples 1 and Comparative Examples 1 through 3, having thus arranged first, second and third catalyst layers 11, 12 and 13 were installed to a paint drying oven for an automotive painting line to evaluate catalytic performance.

Figure 3:
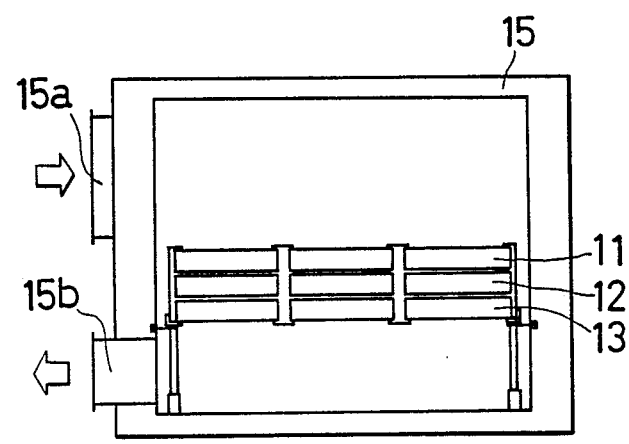
FIG. 3 is a schematic cross sectional view of a preferred embodiment of an exhaust gas processing apparatus for a paint drying oven according to this invention viewed in the direction of the arrow "A" in FIG. 2.

A plan view of the paint drying oven layout is schematically illustrated in FIG. 2. The paint drying oven comprises the exhaust gas processing apparatus 1, an exhaust gas drawing fan 2, a burner 3, a combustion blower 4, a heat exchanger 5, an air jet fan 6, and a control panel 7. Ducts interconnect the exhaust gas processing apparatus 1, the exhaust gas drawing fan 2, the burner 3, the combustion blower 4, the heat exchanger 5 and the air jet fan 6. The exhaust gas processing apparatus 1 comprises the first catalyst layer 11, the second catalyst layer 12 and the third catalyst layer 13 disposed in this order from the upstream side to the downstream side in the reaction container 15 as shown in FIG. 3, i.e. a cross sectional view seen in the direction of the arrow "A" of FIG. 2. The testing conditions were as follows:

| | |
|---|---|
| Reaction Temperature | 350° C. |
| Inlet Total Hydrocarbon (THC) Concentration | 1000 ppm |
| Inlet Odor Concentration | 120000 or more |
| Operating Period | 500 hours |

The pressure drop between the inlet 15a and outlet 15b (in mm Aq), the outlet total hydrocarbon concentration (THC in ppm), and the outlet odor concentration were examined. Here, the outlet total hydrocarbon concentration (THC in ppm) was a value converted into methane concentration. The outlet odor concentration was obtained by 3-point comparison method.

TABLE 2

| | Ex. 1 | Com. Ex. 1 | Com. Ex. 2 | Com. Ex. 3 |
|---|---|---|---|---|
| Pressure Drop (mm Aq) | 120 | 115 | 250 | 65 |
| THC Concentration (ppm) | 15 | 65 | 70 | 42 |
| Odor Concentration (ppm) | 380 | 5600 | 8200 | 3800 |

Example 1: The second preferred embodiment of the exhaust gas processing apparatus 1 was superior to Comparative Examples 1 through 3, because Example 1 exhibited decreased pressure drop, decreased THC concentration and decreased odor concentration, and because the following are apparent from the results of the evaluation summarized in Table 2.

Comparative Example 1 without the first catalyst layer 11 exhibited no pressure drop but had deteriorated exhaust gas purifying abilities.

Comparative Example 2 employed the glass fiber cloths for the first catalyst layer 11 exhibited increased pressure drop, decreased amount of processed exhaust gas, and had degraded exhaust gas purifying abilities, because the tar-like substances were deposited on the first catalyst layer 11.

Comparative Example 3 without the third catalyst layer 13 exhibited no increment in pressure drop but had insufficient exhaust gas purifying abilities, because aldehydes were incompletely reduced.

THIRD PREFERRED EMBODIMENT (Initial Activity Evaluation on Cu-Ce-Ag and Cu-Ce Catalysts)

At first, the present inventors conducted an experiment in order to clarify that the exhaust gas processing apparatus of the present invention distinguishes over an exhaust gas processing apparatus of the prior U.S. patent application, Ser. No. 817,722. The experiment was performed with a laboratory fixed bed flow reaction system under the following conditions:

| | |
|---|---|
| Support | γ-Alumina Pellet Substance (φ3 − 6 mm) |
| Processed Gas | 400 ppm Acetaldehyde and Balance of Air |
| Space Velocity (SV) | 40000 hr$^{-1}$ |
| Heating Rate | 2° C./minute |

Figure 4:
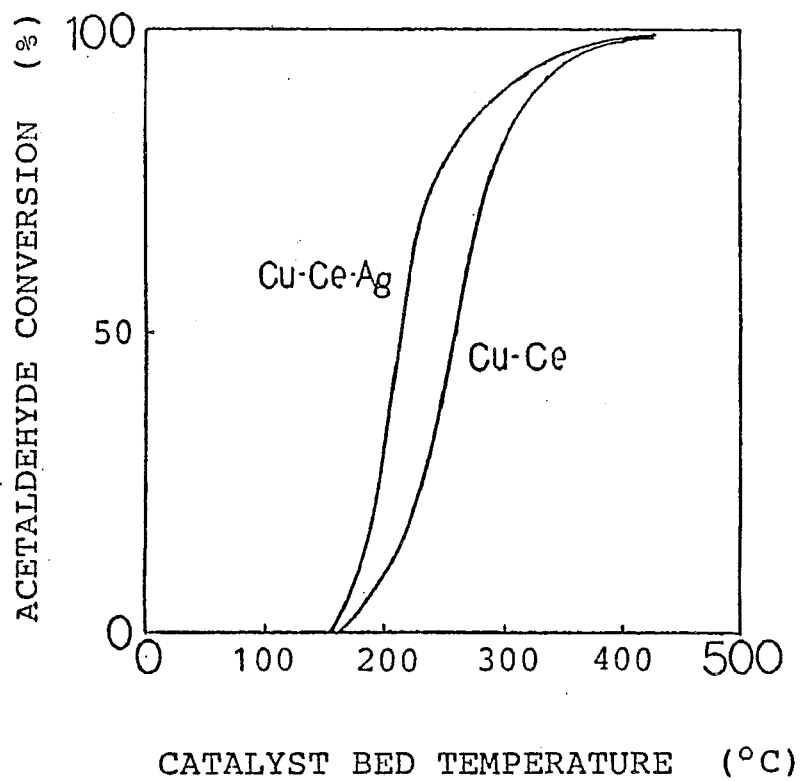
FIG. 4 is a graph comparing initial catalyst activities of copper-cerium-silver catalyst with those of copper-cerium catalyst.

The results of this experiment are shown in FIG. 4. FIG. 4 tells us that Cu-Ce-Ag catalyst of the present invention exhibited initial catalyst activity at lower temperatures than Cu-Ce catalyst of the prior U.S. patent application did. Consequently, it is apparent from FIG. 4 that Cu-Ce-Ag catalyst is superior to Cu-Ce catalyst in the initial catalyst activity.

Then, four exhaust gas processing apparatus, Examples 2 and 3, and Comparative Examples 4 and 5 were installed. They had arrangements of the first, second and third catalyst layers 11, 12 and 13 as summarized in Table 3.

TABLE 3

| | Ex. 2 | Ex. 3 | Com. Ex. 4 | Com. Ex. 5 |
|---|---|---|---|---|
| 1st Catalyst Layer | F | G | H | F |
| 2nd Catalyst Layer | I | G | I | I |
| 3rd Catalyst Layer | K | L | J | J |

Note: Marks "F" through "L" indicate the following:

| | | |
|---|---|---|
| F: | Support | 6-mesh Cordierite Foamed Substance |
| | Apparent Surface Area | 15 cm²/c.c. |
| | Carrier Layer | γ-alumina, 30 g/lit. |
| | Size | 300 mm × 300 mm × 50 mm |
| | Catalyst | Pt, 0.15 g/lit. |
| G: | Support | 8-mesh Cordierite Foamed Substance |
| | Apparent Surface Area | 15 cm²/c.c. |
| | Carrier Layer | γ-alumina, 30 g/lit. |
| | Size | 300 mm × 300 mm × 50 mm |
| | Catalyst | Pt, 0.15 g/lit. |
| H: | Support | 5 pieces of Glass Fiber Cloths E151 as per JIS R3413 |

TABLE 3-continued

|   | Catalyst | Pt, 0.15 g/lit. |
|---|---|---|
| I: | Support | γ-alumina Pellet Substance (φ2 − 6 mm) |
|   | Catalyst | Pt, 1.5 g/lit. |
| J: | Support | 13-mesh Cordierite Foamed Substance |
|   | Apparent Surface Area | 13 cm²/c.c. |
|   | Carrier Layer | α-alumina, 20 g/lit. |
|   | Size | 300 mm × 300 mm × 50 mm |
|   | Catalyst | Cu:Ce = 4.0:0.4 (wt. %) |
| K: | Support | 13-mesh Cordierite Foamed Substance |
|   | Apparent Surface Area | 13 cm²/c.c. |
|   | Carrier Layer | α-alumina, 20 g/lit. |
|   | Size | 300 mm × 300 mm × 50 mm |
|   | Catalyst | Cu:Ce:Ag = 4.0:0.4:1.5 (wt. %) |
| L: | Support | 8-mesh Cordierite Foamed Substance |
|   | Apparent Surface Area | 15 cm²/c.c. |
|   | Carrier Layer | α-alumina, 30 g/lit. |
|   | Size | 300 mm × 300 mm × 50 mm |
|   | Catalyst | Cu:Ce:Ag = 4.0:0.4:1.5 (wt. %) |

Note: Catalysts were loaded by methods similar to those described in the First Preferred Embodiment section.

The four exhaust gas processing apparatuses, i.e. Examples 2 and 3 and Comparative Examples 4 and 5, thus prepared were installed to the same paint drying oven for an automotive painting line as described in the Second Preferred Embodiment section. Performance of the four exhaust gas processing apparatuses were evaluated under the following conditions:

| Exhaust Gas | Actual exhaust gas discharged by the paint drying oven |
|---|---|
| Amount of Exhaust Gas Processed | 100 Nm³/min. |
| Operating Period | 1500 hours |

Results of the evaluation are summarized in Table 4.

TABLE 4

|  | THC Concentration (ppm) | | | | Reaction Temp. |
|---|---|---|---|---|---|
|  | Inlet | 1st Cat. Layer | 2nd Cat. Layer | 3rd Cat. Layer |  |
| Ex. 2 | 2700 | 9.8 | 2.1 | 1.4 | 400° C. |
| Ex. 3 | 3941 | 53.7 | 2.4 | 1.3 | 370° C. |
| Com. Ex. 4 | 820 | 196 | 11.8 | 10.5 | 450° C. |
| Com. Ex. 5 | 2737 | 98 | 73.5 | 24.5 | 450° C. |

The following is therefore understood from Table 4. Although Examples 2 and 3 were operated under severer conditions, i.e. lower reaction temperatures and higher inlet THC concentrations, Examples 2 and 3 employing Cu-Ce-Ag catalyst for the third catalyst layer 13 had superior purifying abilities to those of Comparative Examples 4 and 5 employing Cu-Ce catalyst for the third catalyst layer 13.

What is claimed is:

1. An exhaust gas processing apparatus for a paint drying oven comprising:
   a reaction container;
   a first catalyst layer disposed at an upstream side of said reaction container comprising a support of a honeycomb substance or a foamed substance, a carrier layer formed on said support and a platinum group element catalyst loaded on said carrier layer;
   a second catalyst layer disposed downstream of said first catalyst layer comprising a support of a pellet substance, a honeycomb substance, or a foamed substance and a platinum group element catalyst; and
   a third catalyst layer disposed downstream of said second catalyst layer comprising a support, a carrier layer formed on said support, and a copper-cerium-silver catalyst containing 4 wt. % copper, 0.4 wt. % cerium, and 1.5 wt. % silver based on the weight of said carrier, loaded on said catalyst layer;
   whereby harmful components contained in exhaust gases are oxidized and decomposed.

* * * * *